F. A. Pratt,
Friction Clutch.
No 2,588. Reissued Apr. 30, 1867.
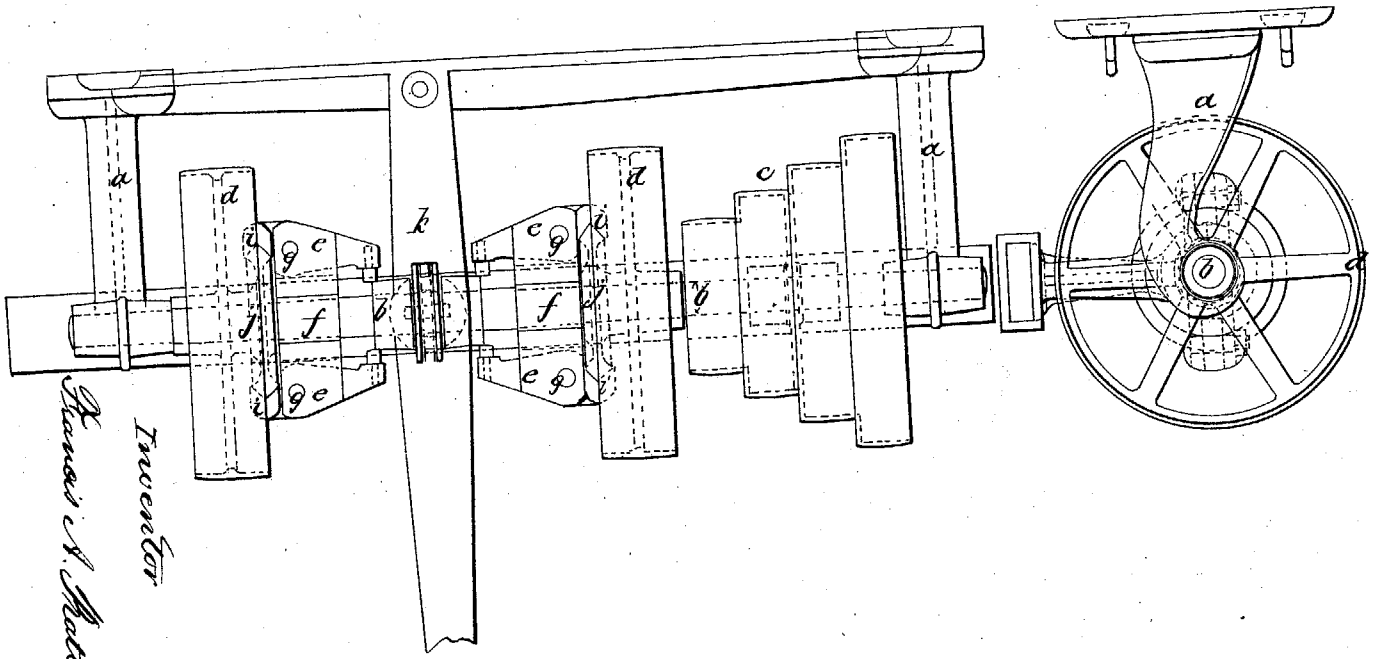
Witnesses
Enos H. Lane
Jeremy W. Bliss
Inventor
Francis A. Pratt
AM. PHOTO-LITHO. CO. N.Y. (OSBORNE'S PROCESS)

United States Patent Office.

GEORGE S. LINCOLN AND COMPANY, OF HARTFORD, CONNECTICUT, ASSIGNEES OF FRANCIS A. PRATT, BY MESNE ASSIGNMENTS.

*Letters Patent No.* 29,939, *dated September* 4, 1860; *reissue No.* 2,588, *dated April* 30, 1867.

IMPROVEMENT IN DEVICE FOR STOPPING AND CHANGING MOTION.

The Schedule referred to in these Letters Patent and making part of the same.

TO ALL WHOM IT MAY CONCERN:

Be it known that FRANCIS A. PRATT, of the city and county of Hartford, and State of Connecticut, did invent certain new and useful Improvements in Device for Stopping and Changing Motion for counter-shafts or other like purposes; and to enable others skilled in the art to make and use the same, we will proceed to describe its construction and operation, referring to the drawings, in which the same letters indicate like parts in each of the figures.

The nature of this invention consists in the construction and arrangement of proper clamp or friction device for the purpose of starting, stopping, or of changing the back and forward motion of a counter-shaft for lathes, or other machinery, to which it may be adapted, where two loose driving-pulleys are used on a counter-shaft, and driven by one straight or open belt, and the other by a cross-belt. Or, in other words, it consists in constructing and arranging a proper clamp or friction device on a counter-shaft, between two loose driving-pulleys, driven from the main or other driving-shaft by one open belt, and one cross-belt to produce opposite motion, so that the said pulley or pulleys may be made tight upon said counter-shaft alternately by the action of said device. The nature of this invention further consists in constructing and arranging a proper clamp or friction device by the side of one loose driving-pulley, which is driven from the main or driving-shaft, for the purpose of quickly and noiselessly starting and stopping the motion of a lathe or other machine. The nature of this invention further consists in providing said clamp or friction device with adjusting screws, or their mechanical equivalents, for the purpose of adjusting said clamp or friction device so that it shall be quickly and easily operated upon, and so that all its parts shall act jointly and in unity with each other.

The important office of these adjusting screws, or their mechanical equivalents, is of great importance in order to secure the perfect working of all the parts in unison with each other; because, if from imperfect adjustment of the clamping or friction device, the pulley or pulleys should fail to be acted upon in the desired manner, to engage or disengage their action with the shaft, at the moment when the workman has an important piece of work in hand, and the instant stopping of the machine is necessary, serious damage might result therefrom.

In the accompanying drawings are shown a side and end elevation.

*a* are the hangers, which support and hold the counter-shaft. *b* is the counter-shaft. *c* is a cone or other pulley, secured to the shaft *b*, by means of which the power or motion is transmitted from the counter-shaft to a spindle or pulley of a lathe or other machine. *d* are pulleys which are fitted closely and turn freely upon the shaft *b*, one of which receives a straight belt from the main or driving-shaft, while the other receives a cross-belt from the main or driving-shaft. *e* are clamps, levers, or friction-arms, secured to or in the collar *f*, by fulcrum pins *g*, or in some other suitable manner, so as to hold said levers or arms, one or both, firmly in their proper place upon the counter-shaft *b*, and by the side of the pulley or pulleys *d*. *e'* are set-screws for properly adjusting each lever or clamp, to act simultaneously and in unison with the actuating device. *f* are collars secured to the shaft *b* by set-screws, keys, &c. The clamp ends *i* of the levers or arms *e* are fitted to the edges of a bevelled or V-shaped surface or edge of the collar *j* which forms a part of the pulley *d*, or to any other properly arranged friction surface on the pulley *d*, and is so fitted to the said bevelled or other properly formed surface, or V-shaped surface or edge of the collar *j*, that when not in use the collar, with the pulley *d*, will revolve freely without noise or friction upon the counter-shaft *b*. It will be clearly seen that the surface upon which the clamp or friction ends *i* of the levers or arms *e* take their bearing, may be made flat, or V-shape, and that it is perfectly immaterial, so far as connecting the motion of the shaft with the pulley is concerned, whether it be arranged near the hub or near to the rim of said wheel or pulley. In either case the object is to unite and produce a quick, easy, and positive action of the wheel or pulley with the shaft. On the shaft *b*, between the ends of the clamp-arms *e*, is arranged a sliding, wedge-shaped collar, *l*, having a groove or flanges, in or between which is arranged a fork or two-prong clutch, *n*, such as are commonly used for change-motion. *k* is a lever, to which the clutch *n* is secured, the upper end of which is secured to the cross-piece which extends from one hanger to the other, or other convenient fastening, for the purpose of actuating the wedge-shaped collar *l*, or its mechanical equivalent. Now it will be seen, that when the machine is at rest the wedge-shaped collar *l*, or its mechanical equivalent, is nearly central between the two clamp or friction-arms *e* and the pulleys *d*, which have the bevelled or V-shaped surface or edge collar *j*, which are allowed to revolve freely on the shaft *b*; and when it is desirable to start the machine with a forward motion, the handle *k* is moved in a direction towards the pulley which will produce that result, and in thus moving it the collar *l* is moved inward between the outer ends of the clamps *e*, while the clamp ends take fast hold of the collar *j*. And by moving the handle *k* in the opposite direction a reverse motion will be produced.

Thus the motion is quickly and easily changed without noise, breaking, or otherwise disarranging or injuring the work being executed; and that by the aid of the screws *e'*, or their mechanical equivalents, the parts can be perfectly adjusted so as to work in perfect unison. It will also be observed that this clamp will afford the same advantage on counter or other shafts having but one loose driving-pulley, instead of having a tight and loose pulley as in the common way. This device may also be applied as a fastener to pulleys arranged upon a line shaft, so that pulleys not required to be in constant use may stand idle, while the shaft is free to turn in its eye for the purpose of saving the power required for driving said pulleys.

We believe we have thus described the nature, construction, operation, and advantage of this improvement so as to enable others skilled in the art to make and use the same therefrom.

What we claim, therefore, and desire to secure by Letters Patent, is—

The combination of the levers or clamps *e*, disk or collar *j*, substantially as and for the purpose described.

We claim the application of a sliding or wedge collar *e*, or its mechanical equivalent, for the purpose of operating the said levers, or clamps *e*, substantially as described.

We claim the clamps *e*, or their mechanical equivalents, in combination with the set-screws *e'*, or their mechanical equivalents, with proper actuating device, substantially as and for the purpose described.

GEO. S. LINCOLN & CO. [L. S.]

Witnesses:

ENOS H. LANE,

JEREMY W. BLISS.